(12) United States Patent
Saeki et al.

(10) Patent No.: US 7,927,219 B2
(45) Date of Patent: Apr. 19, 2011

(54) TORQUE FLUCTUATION ABSORBING APPARATUS

(75) Inventors: Tomohiro Saeki, Anjo (JP); Satoshi Nakagaito, Kariya (JP); Makoto Takeuchi, Obu (JP); Masanori Suzuki, Obu (JP); Masaru Ebata, Chita (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/731,181

(22) Filed: Mar. 25, 2010

(65) Prior Publication Data

US 2010/0175963 A1 Jul. 15, 2010

Related U.S. Application Data

(62) Division of application No. 11/706,216, filed on Feb. 15, 2007, now Pat. No. 7,766,752.

(30) Foreign Application Priority Data

Feb. 16, 2006 (JP) .................. 2006-039182

(51) Int. Cl.
*F16D 7/02* (2006.01)
(52) U.S. Cl. ..................... 464/46; 464/68.41
(58) Field of Classification Search ............ 464/46, 464/68.41, 45, 47, 48; 192/210.1, 213.12, 192/213.22, 214.1
See application file for complete search history.

(56) References Cited

U.S. PATENT DOCUMENTS

| | | | |
|---|---|---|---|
| 2,114,247 A | | 4/1938 | Davis |
| 2,378,749 A | * | 6/1945 | Brown ................. 464/46 X |
| 3,105,371 A | * | 10/1963 | Forrest .................. 464/46 |
| 3,323,328 A | | 6/1967 | Montgomery |
| 3,664,472 A | * | 5/1972 | Martini et al. ........... 464/48 X |
| 4,222,476 A | | 9/1980 | LeBrise |
| 4,223,776 A | | 9/1980 | Berlioux |
| 4,463,275 A | | 7/1984 | Ragaly |

(Continued)

FOREIGN PATENT DOCUMENTS

JP 60-139945 U 9/1985

(Continued)

OTHER PUBLICATIONS

Japanese Office Action dated Jun. 29, 2010 issued in the corresponding Japanese Patent Application No. 2006-039182 and English-language translation.

*Primary Examiner* — Greg Binda
(74) *Attorney, Agent, or Firm* — Buchanan Ingersoll & Rooney PC (57) ABSTRACT

A torque fluctuation absorbing apparatus provided between a driving source and a transmission and transmitting torque from the driving source to the transmission, the apparatus absorbing fluctuations in the torque and limiting a maximum value of the torque, the apparatus includes a flywheel, a supporting member, a first plate having a sliding surface, a second plate having a sliding surface, a disc spring supported by the supporting member and biasing one of the first and second plates towards the other one thereof, a friction material sandwiched tightly between the sliding surface of the first plate and the sliding surface of the second plate, a damper mechanism connected to the friction material and transmitting the torque from the driving source to an input shaft of the transmission, and a cover member demarcating the sliding surfaces of the first and second plates from an exterior of the torque fluctuation absorbing apparatus.

5 Claims, 7 Drawing Sheets

U.S. PATENT DOCUMENTS

| | | | |
|---|---|---|---|
| 4,634,398 A | 1/1987 | Alas | |
| 4,726,455 A | 2/1988 | East | |
| 4,760,754 A * | 8/1988 | Friedmann | 464/46 X |
| 4,876,917 A | 10/1989 | Aiki et al. | |
| 5,139,124 A * | 8/1992 | Friedmann | 464/46 X |
| 5,601,002 A | 2/1997 | Lucienne | |
| 5,836,820 A | 11/1998 | Reik et al. | |
| 6,582,312 B2 | 6/2003 | Suzuki et al. | |
| 6,601,682 B2 | 8/2003 | Lehmann et al. | |
| 6,776,718 B2 * | 8/2004 | Tu | 464/46 |
| 6,923,725 B2 | 8/2005 | Takeuchi et al. | |
| 2002/0056542 A1 | 5/2002 | Yamamoto et al. | |
| 2002/0092715 A1 | 7/2002 | Yabe et al. | |
| 2004/0159521 A1 | 8/2004 | Yamamura et al. | |
| 2005/0067249 A1 | 3/2005 | Nakagaito et al. | |

FOREIGN PATENT DOCUMENTS

| | | |
|---|---|---|
| JP | 61-116764 U | 7/1986 |
| JP | 61-197828 A | 9/1986 |
| JP | 61-256031 A | 11/1986 |
| JP | 2002-013547 A | 1/2002 |
| JP | 2002-181085 A | 6/2002 |
| JP | 2003-194095 A | 7/2003 |
| JP | 2005-127507 A | 5/2005 |

\* cited by examiner

TORQUE FLUCTUATION ABSORBING APPARATUS

CROSS REFERENCE TO RELATED APPLICATIONS

This application is a divisional of U.S. patent application Ser. No. 11/706,216, filed Feb. 15, 2007, now U.S. Pat. No. 7,766,752 B2, and claims priority under 35 U.S.C. §119 to Japanese Patent Application No. 2006-039182, filed on Feb. 16, 2006, the entire contents of each of which is incorporated herein by reference.

FIELD OF THE INVENTION

This invention relates to a torque fluctuation absorbing apparatus disposed between a driving source and a transmission and absorbing torque fluctuations created between the driving source and the transmission. More specifically, the invention relates to a torque fluctuation absorbing apparatus having a limiting function for blocking transmission of excessive torque.

BACKGROUND

In JP 2002-13547A, a known torque fluctuation absorbing apparatus is disclosed. A damper for a hybrid type driving device is disclosed in JP 2002-13547A, and the damper has a limiter mechanism in addition to a damper mechanism. The damper mechanism absorbs driving torque fluctuations of a flywheel fixed to a driving shaft of a driving source, and the limiter mechanism is disposed on a radially outward portion of the damper mechanism. The limiter mechanism is configured by crimping friction materials with the flywheel directly or indirectly (via a frictional surface plate). The friction material is fixed to the outer circumference of the damper mechanism. When fluctuating torque reaches a predetermined value (limit torque value), the limiter mechanism allows sliding of the damper mechanism to prevent excessive torque from being input to a transmission.

Further, in JP 2003-194095A, another torque fluctuation absorbing apparatus is disclosed. The torque fluctuation absorbing apparatus is configured so as to prevent the foreign objects such as dust from adhering to the limiter mechanism considering the exposure of the limiter portion to the outer atmosphere during transportation. In addition, in JP 2003-194095A, it is suggested that a slit is formed to communicate a radially inward portion with a radially outward portion in the friction material of the limiter mechanism as a part of measures for adhesion of foreign objects.

However, in the known torque fluctuation absorbing apparatus described above, the limit torque value is subject to change due to rust, corrosion and other deteriorations which are caused by moisture and intrusion of water and other liquid from the outside after the shipment.

In JP 2003-194095A, a slit, which communicates with the radially inward portion with the radially outward portion of the friction material, is formed in the friction material of the limiter mechanism for the stabilization of the limit torque value. However, in order to retain the limit torque value with higher precision, factors (water, sand, dust and other foreign substances) for the corrosion which can intrude from the radially inward side of the friction material should be considered.

The present invention has been made in view of the above circumstances, and provides a torque fluctuation absorbing apparatus which eliminates factors causing the corrosion of a limit mechanism and stabilizes a limit torque value over a long duration.

SUMMARY OF THE INVENTION

According to an aspect of the present invention, a torque fluctuation absorbing apparatus provided between a driving source and a transmission and transmitting torque from the driving source to the transmission, the apparatus further absorbing fluctuations in the torque transmitted and limiting a maximum value of torque to be transmitted to the transmission, the apparatus includes a flywheel connected with a driving shaft of the driving source, a supporting member unitarily rotating with the flywheel, a first plate having a sliding surface, a second plate having a sliding surface, a disc spring supported by the supporting member and biasing one of the first and second plates towards the other one thereof, a friction material sandwiched tightly between the sliding surface of the first plate and the sliding surface of the second plate, a damper mechanism connected to the friction material and transmitting the torque transmitted from the driving source to an input shaft of the transmission, and a cover member demarcating the sliding surfaces of the first and second plates from an exterior of the torque fluctuation absorbing apparatus.

According to another aspect of the present invention, a torque fluctuation absorbing apparatus provided between a driving source and a transmission and transmitting torque from the driving source to the transmission, the apparatus further absorbing fluctuations in the torque transmitted and limiting a maximum value of toque to be transmitted to the transmission includes a flywheel connected with a driving shaft of the driving source, a supporting member unitarily rotating with the flywheel, a first plate having a sliding surface being corrosion resistant, a second plate having a sliding surface being corrosion resistant, a disc spring supported by the supporting member and biasing one of the first and second plates towards the other one thereof, a friction material sandwiched tightly between the sliding surface of the first plate and the sliding surface of the second plate, a damper mechanism connected to the friction material and transmitting the torque transmitted from the driving source to an input shaft of the transmission.

According to another aspect of the present invention, a torque fluctuation absorbing apparatus provided between a driving source and a transmission and transmitting torque from the driving source to the transmission, the apparatus further absorbing fluctuations in the toque transmitted and limiting a maximum value of the toque to be transmitted to the transmission, the apparatus includes a flywheel connected with a driving shaft of the driving source, a supporting member unitarily rotating with the flywheel, a first plate having a sliding surface, a second plate having a sliding surface, a disc spring supported by the supporting member and biasing one of the first and second plates towards the other one thereof, a friction material interposed with pressure between the sliding surface of the first plate and the sliding surface of the second plate, a damper mechanism connected to the friction material and transmitting the torque transmitted from the driving source to an input shaft of the transmission, wherein a limit toque value, at which a relative rotation between the friction material and each first and second plate starts against frictional force between the friction material and each first and second plate, is set to a value ranging from 0.7 to 1.4 times larger than the maximum value of torque generated by the driving source.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
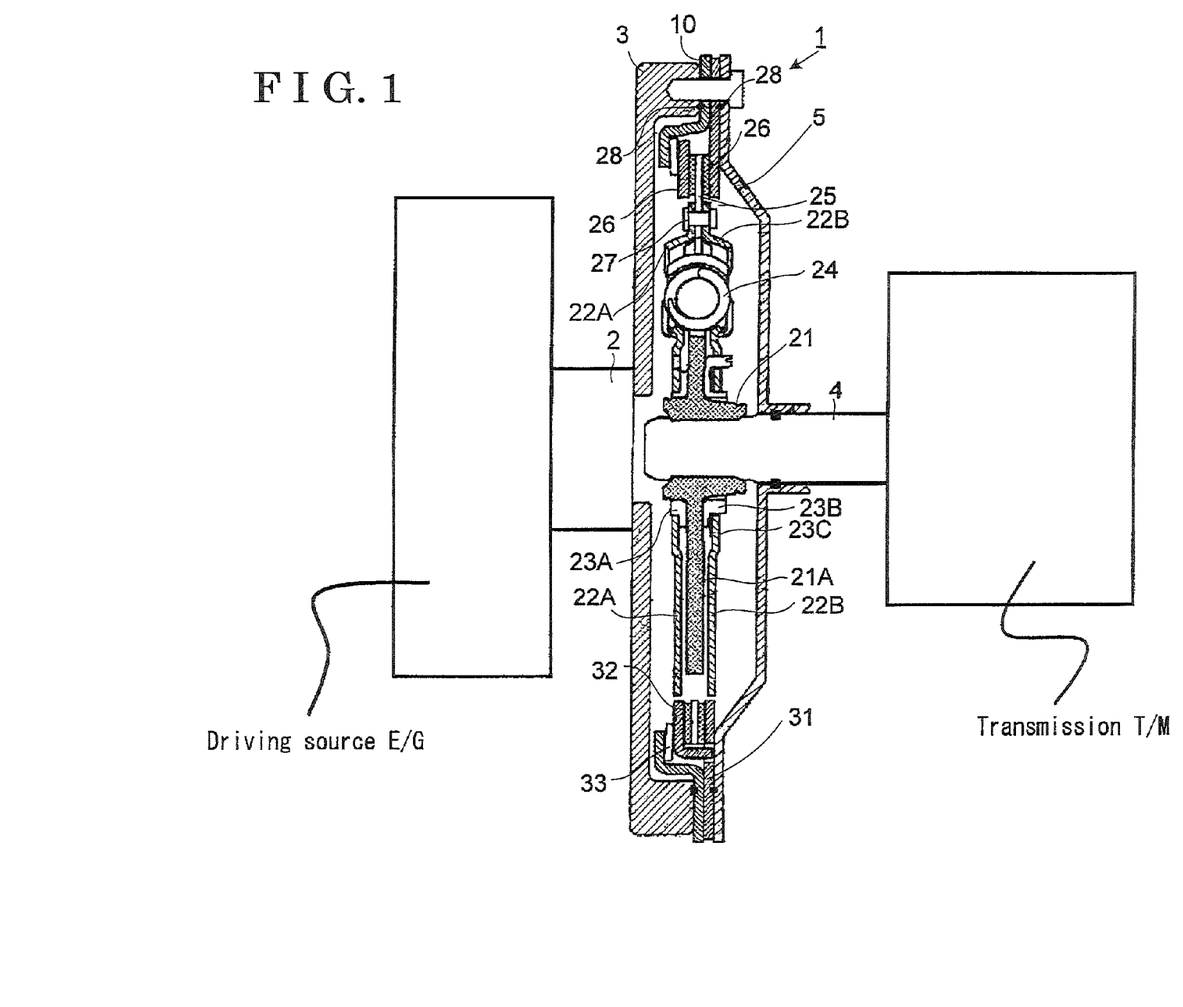
FIG. 1 is a sectional view schematically illustrating a configuration of a torque fluctuation absorbing apparatus according to a first embodiment of the invention.

Embodiments of the present invention will be described below with reference to the attached drawings. FIG. 1 is a sectional view schematically illustrating a configuration of a torque fluctuation absorbing apparatus according to a first embodiment of the invention. Hereinafter, the torque fluctuation absorbing apparatus disposed between an engine of a vehicle and a transmission will be described in the embodiments.

Referring to FIG. 1, a torque fluctuation absorbing apparatus 1 is configured with a flywheel 3 connected with a driving shaft 2, a cover member 5, a damper mechanism and a limiter mechanism. The damper mechanism and the limiter mechanism are disposed between the flywheel 3 and the cover member 5.

A supporting member 10 is firmly attached to the flywheel 3 to be integrally rotatable with the flywheel 3. The supporting member 10 supports a disc spring 33.

The damper mechanism is a mechanism which absorbs fluctuations of a driving torque of the flywheel 3 fixed to the driving shaft (crankshaft) 2 of a driving source (engine). The limiter mechanism is a mechanism which limits transmission of a driving force from the driving shaft 2 to an input shaft 4 of the transmission when the fluctuating torque reaches a predetermined value (limit torque value) between the damper mechanism and the flywheel 3.

The damper mechanism is configured with a hub 21, side plates 22A and 22B, a thrust member, damper members 24, a disc 25, friction materials 26 and a rivet 27.

The hub 21 includes a flange portion 21A extending in a radial direction and an internal spline to be engaged with an external spline formed on an outer circumferential surface of the input shaft 4 of the transmission. A plurality of notch portions are provided in a radially outward portion of the flange portion 21A. The notch portions are formed by cutting the flange portion 21A and the damper members 24 are each arranged in the corresponding notch portions while being supported by a spring sheet.

Through holes are provided on radially outward portions of the respective side plates 22A and 22B, and the side plates 22A and 22B support the disc 25 by way of the rivet 27. The side plates 22A and 22B are coaxially arrange with the hub 21 so as to be relatively rotatable therewith. Furthermore, a plurality of windows are provided in each side plate 22A and 22B to accommodate the damper members 24.

The thrust member is an approximately annular-shaped member inserted between a contact surface of the hub 21 and contact surfaces of the side plates 22A and 22B and is configured with a first thrust member 23A, a second thrust member 23B, and a disc spring 23C. The first thrust member 23A is inserted between the contact surface of the hub 21 and the contact surface of the first side plate 22A, and the second thrust member 23B is inserted between the contact surface of the hub 21 and the contact surface of the second side plate 22B. The thrust member causes hysteresis between the flange portion 21A of the hub 21 and the side plates 22A and 22B. In the embodiment, the disc spring 23C is used, however, it is possible to use other biasing means.

Each damper member 24 is a coil spring and is accommodated in the notch portion and the window, which are formed in a position where the hub 21 and the side plates 22A and 22B are facing.

The disc 25 is an approximately annular disc positioned on a radially outward portion of each side plate 22A and 22B. As described above, the disc 25 is interposed at both surfaces by the side plates 22A and 22B. The approximately annular friction materials 26 are firmly attached to both surfaces of the disc 25 in an axial direction.

Figure 2A:
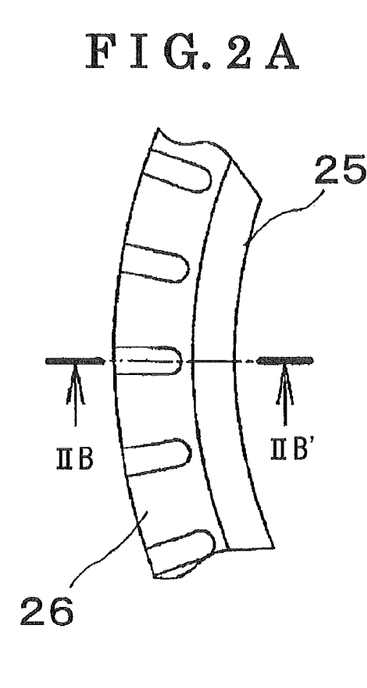
FIG. 2A is a plain view illustrating an example of a surface pattern formed on a surface of a friction material of the torque fluctuation absorbing apparatus according to the first embodiment of the invention and FIG. 2B is a sectional view taken along a line IIB-IIB'.
Figure 2B:
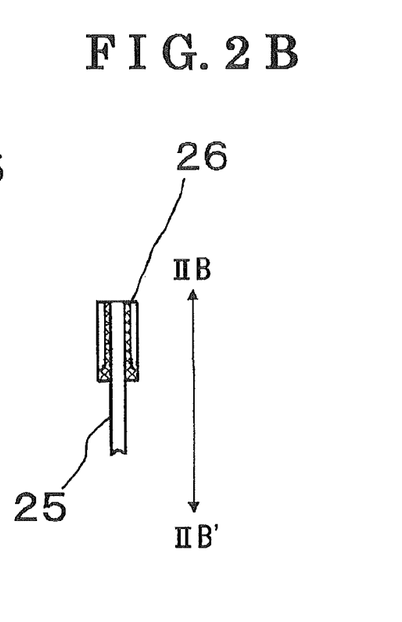
Figure 3A:
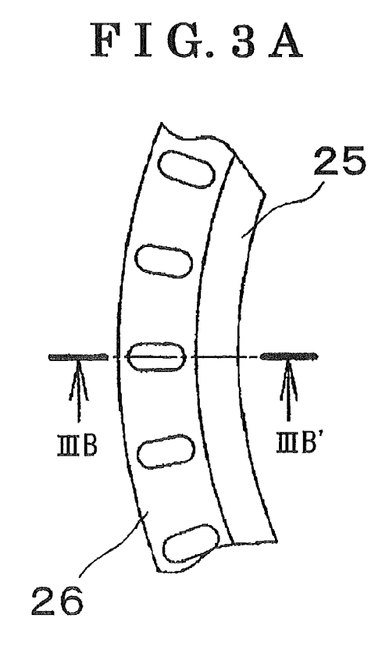
FIG. 3A is a plain view illustrating an example of the surface pattern formed on the surface of the friction material of the torque fluctuation absorbing apparatus according to the first embodiment of the invention and FIG. 3B is a sectional view taken along a line IIIB-IIIB'.
Figure 3B:
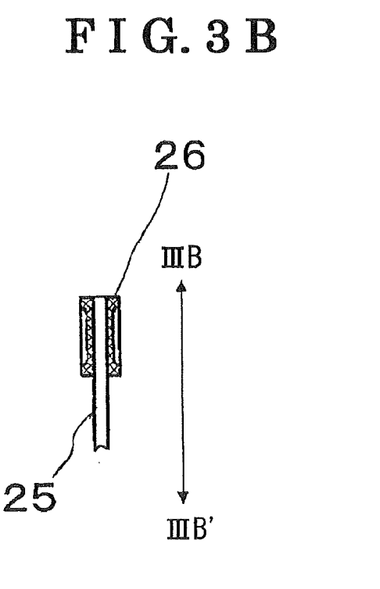

Each friction material 26 is an approximately annular member firmly attached to both sides of the disc 25 by adhesive or bonding techniques. FIG. 2A and FIG. 3A are plain views and FIG. 2B and FIG. 3B are sectional views taken along the lines IIB-IIB' and IIIB-IIIB' respectively. These figures represent examples of the surface patterns formed on the surfaces (friction surfaces) of the friction materials. In the example illustrated in FIG. 2, multiple grooves are formed from a radially inward portion of the frictional material 26 and radially extend to an outer circumferential, i.e. to a radially outer end of the frictional material. Thus, the grooves can open at the outer circumferential side while being sandwiched tightly between first and second plates 31 and 32.

In another example illustrated in FIG. 3, window shaped grooves are formed and extend on the surface of the frictional material 26 in a radial direction. The grooves of FIG. 3 do not reach the radially outer and inner end of the friction material 26. That is, each groove extends from an outer side of the radially inward portion to an inner side of the radially outward portion and becomes hermetically sealed being sandwiched tightly between the first and second plates 31 and 32.

Additionally, a material including glass fibers is employed, and thus the friction material has a high strength against rotation or other movements and withstands being riveted and other fastening techniques. Further, the friction material, which is strong against thermal deformation, can be obtained.

Figure 4A:
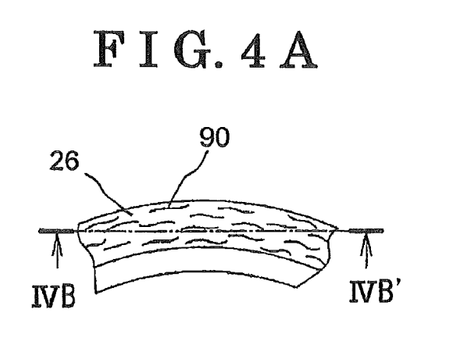
FIG. 4A is a plain view of the friction material.
Figure 4B:
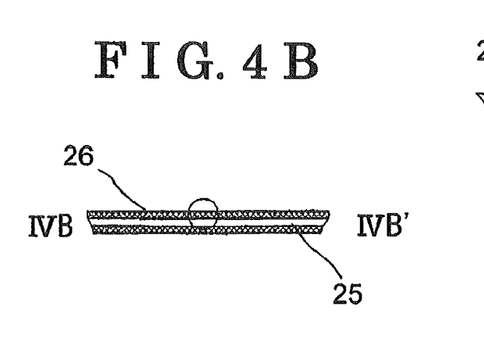
FIG. 4B is a sectional view taken along a line IVB-IVB' and FIG. 4C is an enlarged view of the FIG. 4B.
Figure 4C:
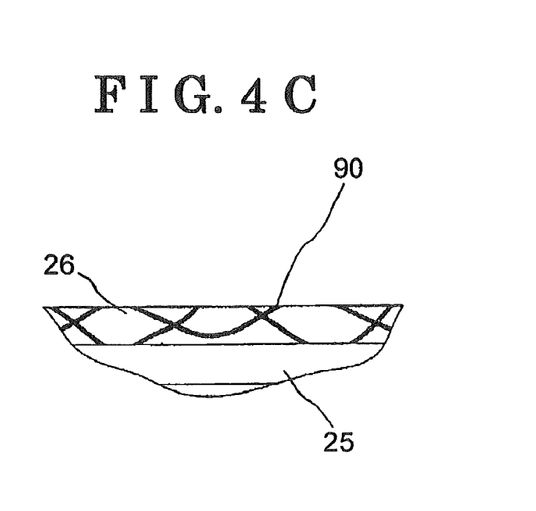

FIG. 4A is a plain view, FIG. 4B is a sectional view taken along a line IVB-IVB', and FIG. 4C is an enlarged view of FIG. 4B. These figures represent the friction material including the glass fiber and manufactured by the conventional method.

As schematically illustrated in FIGS. 4A and 4C, the glass fibers appears on the surface of the friction material and infinitesimal concavoconvexes are formed due to end portions of the glass fibers being cut in a polishing process. Causative substances of the corrosion and the oxidation such as water, sand, dust is accumulated in the concavoconvexes.

Figure 5:
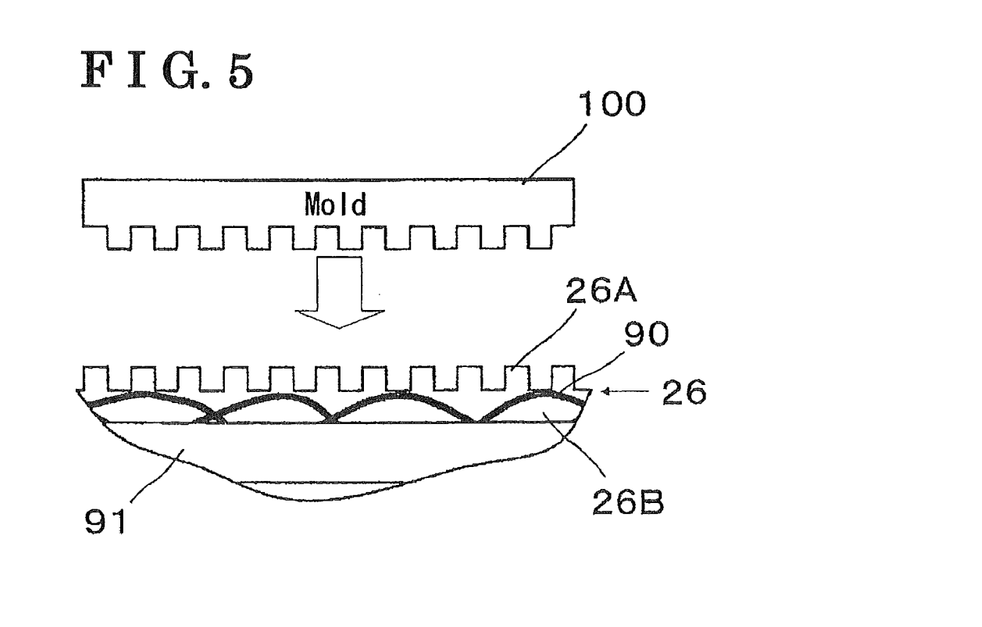
FIG. 5 is a view for explaining a forming method of the surface pattern of the friction material of the torque fluctuation absorbing apparatus according to the first embodiment.

FIG. 5 is a view for explaining the forming process of the surface pattern of the friction material employed in the embodiment. The surface pattern of the friction material 26 is formed by pressing glass fibers 90 by way of a mold 100, which is used for forming groove patterns illustrated in FIG. 2 and FIG. 3, instead of the conventional method. This method enables to reduce the amount of glass fibers in the convex portion of the surface pattern.

It is possible to preferably employ a material including glass fibers by using the process described above. However, it is still possible to employ the material by reducing water absorbability or by obtaining anticorrosion property. Therefore, the friction material, which has a frictional surface coated or laminated by materials which can satisfy the above conditions, can be employed.

Referring again to FIG. 1, the configuration of the torque fluctuation absorbing apparatus will be described. The limiter mechanism is configured with the first and second plates 31 and 32, a disc spring 33, a rivet (not shown; corresponding to 34 in FIG. 6), which fastens the first plate 31 with the supporting member 10. The first plate 31 has an annular sliding surface disposed opposite to the second plate 32 so as to sandwich the friction material 26 of the damper mechanism and is fixed to the flywheel 3 via the supporting member 10 by bolts. The second plate 32 makes a pair with the first plate 31 and has an annular sliding surface to sandwich the friction material 26 of the damper mechanism. The disc spring 33 is interposed between the supporting member 10 and the second plate 32 with an outer end portion being supported in an axial direction. The disc spring 33 biases the second plate 32 by an inner end portion to the direction which spaces away from the supporting member 10. The limit torque value is determined by the biasing force of the disc spring 33, and the flywheel 3 and the damper mechanism are brought into a frictional engagement state via the limiter mechanism.

According to the embodiment, a limit torque value, at which the first and second plates 31 and 32 and each corresponding frictional material 26 starts rotating relative to each other against frictional force between the first and second plates 31 and 32 and each corresponding frictional material 26, is set to a value ranging from 0.7 to 1.4 times larger than the maximum torque value generated by the engine (driving source). In the known torque fluctuation absorbing apparatus, a limit torque value is set to a high value to prevent the damage of the input shaft 4 of the transmission, and the frequency of the operations (sliding) of the limiter mechanism is low. However, the limit torque value is set close to the maximum value of the engine torque in the embodiment. Thus, the frequency of the operations of the limiter mechanism is increased to enable the reduction in characteristic changes due to development of rust on the annular sliding surfaces.

The cover member 5 is formed so as to cover an entire side surface of the first plate 31, which entire side surface is positioned at the side of the transmission. The cover member 5 is fixed to the flywheel 3 by bolts with the first plate 31 and the supporting member 10. The cover member 5 blocks or demarcates the annular sliding surface (of what, in this case could be of the first plate 31, but in claims of the first and second plates) from an exterior of the apparatus for preventing intrusion of foreign objects and water to reduce aging variations of the limit torque value. Also, seal members 28 are disposed between the flywheel 3 and the supporting member 10, between the first plate 31 and the cover member 5, and between the cover member 5 and the input shaft 4 of the transmission.

The torque fluctuation absorbing apparatus 1 is configured as described above and the operation of the torque fluctuation absorbing apparatus 1 will be explained. When the engine is activated, the supporting member 10 rotates unitarily with the flywheel 3 in response to driving of the driving shaft 2. When the fluctuating torque is smaller than a predetermined value (limit torque value), the rotational torque is transmitted to the damper mechanism via the limiter mechanism. More specifically, rotational torque is transmitted to the hub 21 via the thrust member with the damper member 24 expanding and shrinking based on the fluctuating torque transmitted from the disc 25 to the side plates 22A and 22B.

Fluctuations in the driving torque of the engine become larger from the above state. When the fluctuating torque between the damper mechanism and the flywheel 3 reaches the predetermined value (limit toque value) (corresponding to the moment when the fluctuating torque reaches a holding toque rotating in the rotational direction of the friction material 26 between the first and second plates 31 and 32), the friction materials 26 start sliding and the transmission of the fluctuating torque, which is larger than a predetermined value, is stopped between the side plates 22A and 22B and the hub 21.

According to the configuration of the embodiment, the cover member 5 is disposed in the torque fluctuation absorbing apparatus 1. Consequently, the intrusion of the causative substances for the corrosion and the oxidation to the annular sliding surfaces of the limiter mechanism can be restricted. Thus, it is possible to prevent the corrosion and the oxidation of the annular sliding surfaces of the limiter mechanism to restrain the aging variations of the limiter torque value.

Further, as illustrated in FIGS. 2 and 3, the grooves on the surface of each friction material 26 are structured so as to be closed at a radially inner side of the friction material 26 for preventing the intrusion of the causative substances of the corrosion and the oxidization from the radially inner side of the frictional material 26. Therefore, it is possible to further restrain the aging variations in the limit torque value. Furthermore, in the case of the surface pattern illustrated in FIG. 2, the discharging efficiency for abrasion powders and the causative substances for the corrosion and the oxidization is improved.

Still further, in the embodiment, infinitesimal concavoconvexes on the surface of the friction material can be removed by the process illustrated in FIG. 5. Thus, it is possible to remarkably reduce rust occurring with time. For example, in the friction material using glass fibers and having a standard composition, if the amount of the fibers in the convex portion of the surface pattern is smaller by 30 weight percent or greater than that than the amount of the fibers in the concave portion of the surface pattern, it is possible to restrain the appearance of the glass fibers on the surface of the friction material.

Details of a second embodiment of the invention will be described with reference to the attached drawings. In the torque fluctuation absorbing apparatus 101 illustrated in FIG. 6, the cover member 5 of the first embodiment is eliminated in this embodiment. Differences will be described below.

Figure 6:
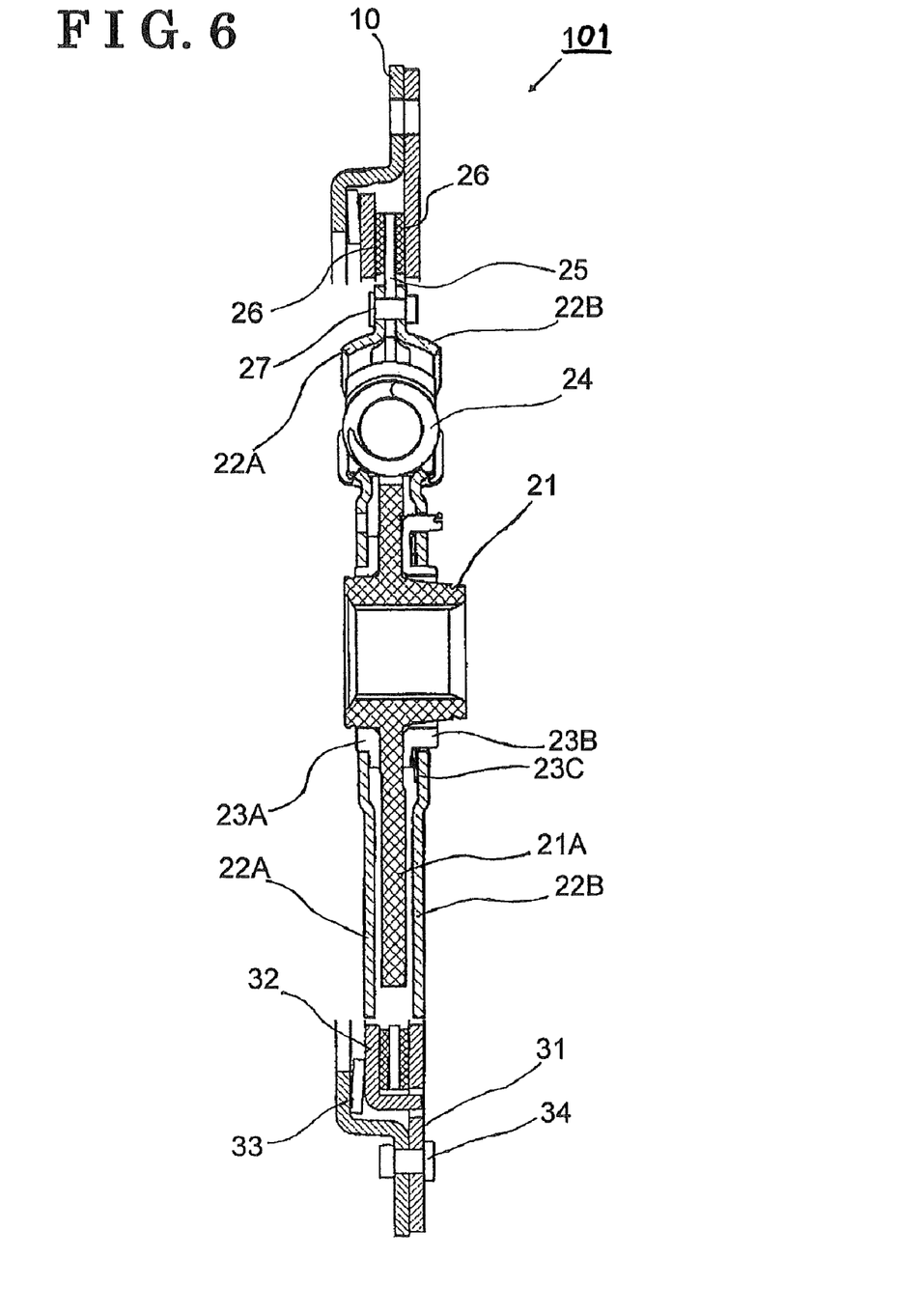
FIG. 6 is a view schematically illustrating a configuration of the torque fluctuation absorbing apparatus according to a second embodiment of the invention.

In the embodiment, the apparatus is characterized in being configured so as to be able to obtain the stable limit torque value without the cover member 5 by providing corrosion resistance on the annular sliding surface of each first and second plate 31 and 32, which is in contact with the friction material 26.

The corrosion resistance of the annular sliding surface of each first and second plate 31 and 32 can be achieved by using corrosion-resistant material such as stainless steel, aluminum, and engineering plastic called enpla.

It is still possible to provide corrosion resistance to the annular sliding surfaces by applying thermal treatments (nitrogenizing treatment, steam treatment, carbonizing treatment and other treatments) and surface improving processes such as plating process to the first and second plates 31 and 32.

Figure 7:
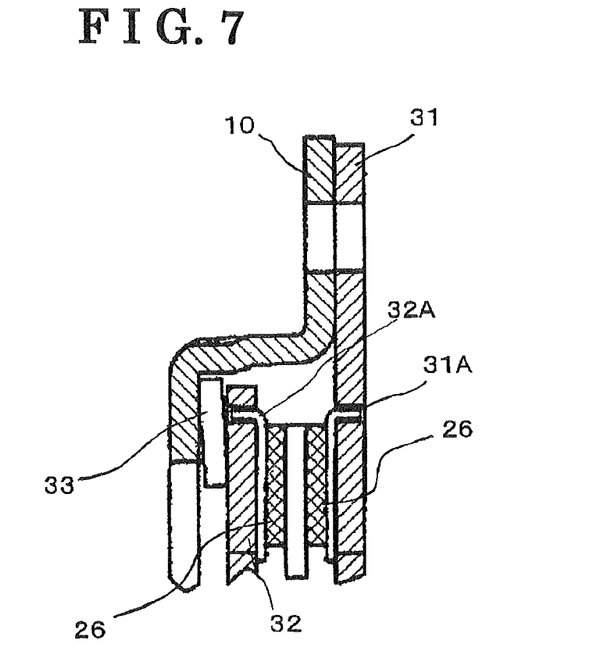
FIG. 7 is a view schematically illustrating an example of a modified configuration of the torque fluctuation absorbing apparatus according to the second embodiment of the invention.

FIG. 7 is a view illustrating an example of the modified configuration of the second embodiment. Referring to FIG. 7, the configuration, in which the first and second plates 31 and 32 are in contact with the friction materials 26 via annular thin plate materials 31A and 32A respectively, is shown. The annular plate materials 31A and 32A are corrosion resistant. An engaging groove for an annular member is provided on an outer circumference portion of each first and second plate 31 and 32. The annular sliding surfaces are configured by engaging pawl portions of the annular thin plate members 31A and 32A with the corresponding engaging grooves for the annular member.

According to the configuration, it is possible to configure the first and second plates 31 and 32 by cheap materials and reduce the amount of the corrosion resistant material and the amount of the surface improving process. Thus, the cost advantage is achieved.

Figure 8:
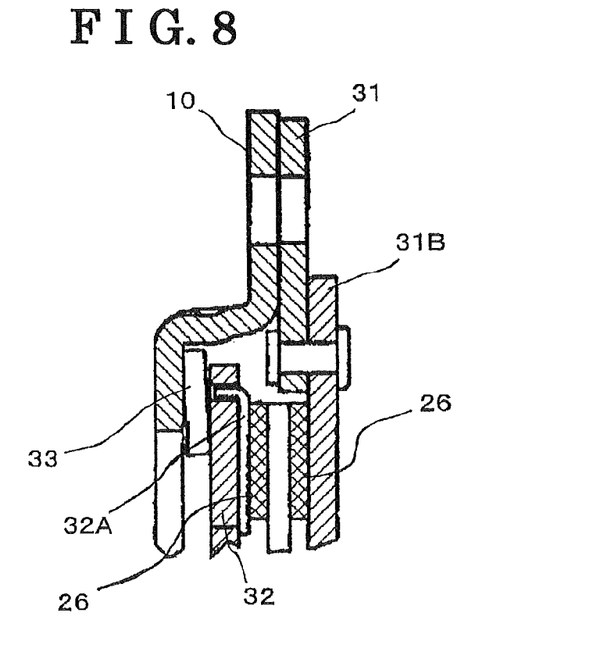
FIG. 8 is a view schematically illustrating another example of the modified configuration of the torque fluctuation absorbing apparatus according to the second embodiment of the invention.
Figure 9:
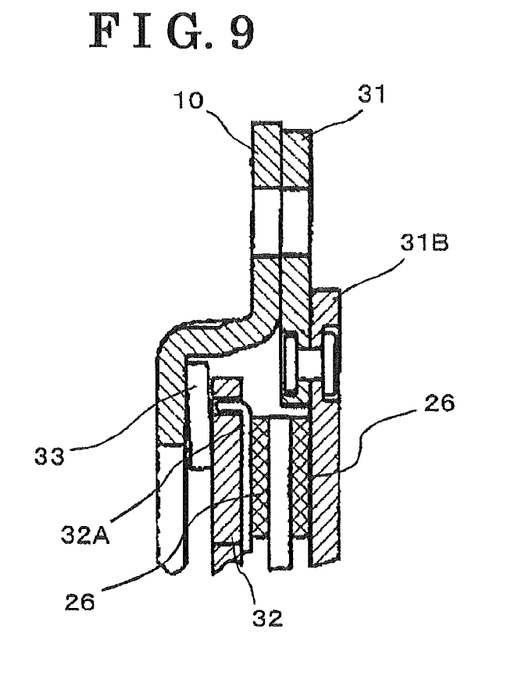
FIG. 9 is a view schematically illustrating another example of the modified configuration of the torque fluctuation absorbing apparatus according to the second embodiment of the invention.

FIGS. 8 and 9 are views illustrating other examples of modified configurations of the second embodiment. Referring to FIGS. 8 and 9, the configurations are identical to the example shown in FIG. 7 in that the annular thin plate member 32A, which is corrosion resistant, is fixed to the second plate 32 of the torque fluctuation absorbing apparatus to be in contact with the friction material 26. However, the annular sliding surface component member 31B, which is corrosion resistant, is fastened by a rivet in these configurations. In the configuration illustrated in FIG. 9, the axial length of the rivet is shorter than the total thickness of the first plate 31 and the annular sliding surface component member 31B.

It is also possible to configure the first and second plates by cheap materials and reduce the amount of the corrosion resistant material and the amount of the surface improving processes with the configuration. Thus, the cost advantage is achieved.

Figure 10:
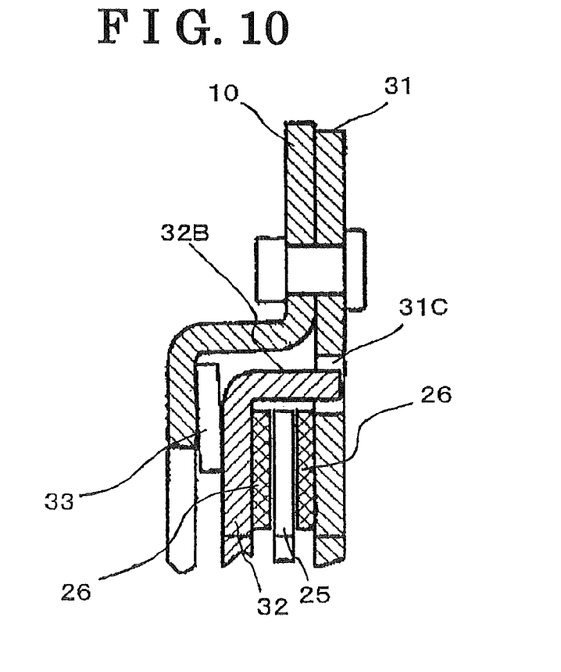
FIG. 10 is an enlarged sectional view schematically illustrating a configuration of the limiter mechanism of the torque fluctuation absorbing apparatus according to a third embodiment of the invention.

Subsequently, a third embodiment of the invention will be described with reference to the drawings. In the third embodiment, the modifications are made in the limiter mechanisms of the first and second embodiments. FIG. 10 is an enlarged sectional view schematically illustrating a configuration of the limiter mechanism of the torque fluctuation absorbing apparatus according to the third embodiment of the invention. Differences will be described below.

Referring to FIG. 10, in the embodiment, the friction materials 26 are fixed to the first plate 31 and the second plate 32 respectively, not to the disk 25. outer circumferential portions of the disk 25 are served as the annular sliding surfaces because of this configuration. In FIG. 10, the disk 25 is spaced away from the friction materials 26 for illustrative purposes. However, in practice, the disk 25 is firmly attached to the friction materials 26 by the disc spring 33.

According to the embodiment, only one component (disc 25) is required to configure the annular sliding surfaces, and thus the cost advantage is achieved in addition to the effects of each embodiment described above.

Details of a fourth embodiment will be described with reference to the drawings. In the fourth embodiment, the stability of the limiter mechanism is secured by improving the operation frequency of the limiter portion. The embodiment is a modification of each embodiment described above and modifications are made to the disk 25 and the second plate 32. Therefore, only modified portions are described.

Figure 11A:
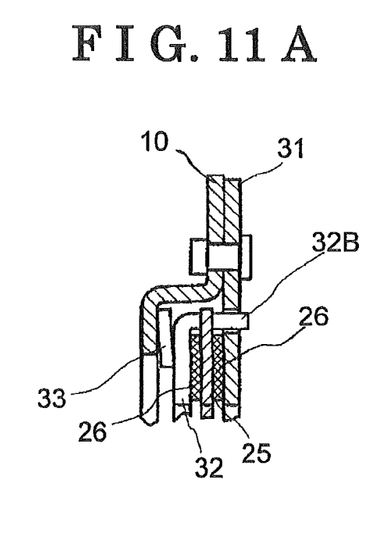
FIG. 11A is an enlarged sectional view schematically illustrating a configuration of the limiter mechanism of the torque fluctuation absorbing apparatus according to a fourth embodiment of the invention and FIG. 11B is a plain view of the disk 25.
Figure 11B:
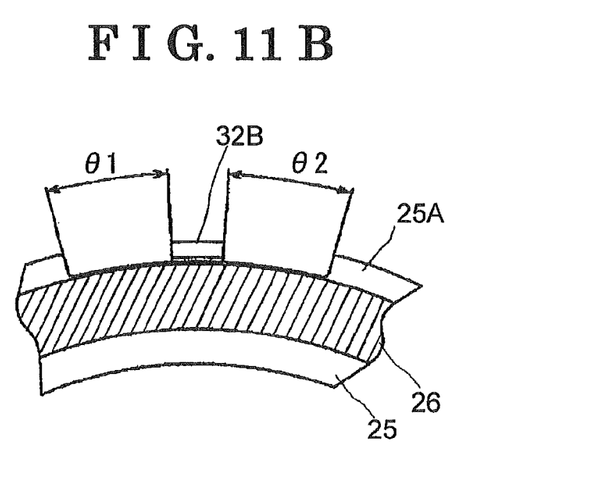

FIG. 11A is an enlarged sectional view schematically illustrating a configuration of the limiter mechanism of the torque fluctuation absorbing apparatus according to the fourth embodiment of the invention and FIG. 11B is a plain view of the disk 25. Referring to FIGS. 11A and 11B, in the embodiment, a stopper 25A is provided at a radially outward portion of the disk 25 and the second plate 32 has a pawl portion 32B. Even when exceeding the limit torque value, the sliding of the second plate 32 is restricted by the pawl portion 32B and the stopper 25A of the disk 25 so as to be in a range of $\ominus 1$ for a normal direction or in a range of $\ominus 2$ for a reverse direction.

The limit torque value is determined by loads for attachments of the first and second plates 31 and 32 and a friction coefficient of the friction materials. According to the embodiment, the torque remains being transmitted because of the presence of the stopper mechanism. Thus, the limit torque value can be set to a low value. For example, the limit toque value can be set a value which is lower than the maximum value of the engine torque. Thus, it is possible to activate the limiter mechanism at the predetermined toque value and prevent the occurrence of rust in the annular sliding surfaces due to long time fixation.

Further, a load of the disc spring 33 can be reduced by lowering the limit torque value. Therefore, the reduction of thickness of the entire apparatus and cost reduction can be achieved.

The stopper portion is provided at the radially outward portion of the disk 25. However, the stopper portion may be provided at a radially inward portion of the disk 25.

Details of a fifth embodiment will be described with reference to the drawings. In the fifth embodiment, discharge efficiency for the causative substances of the corrosion and the oxidization, the abrasion powder generated on the friction surfaces, and dust is further improved. The embodiment is a modification of each embodiment in which the supporting member 10 is modified. Therefore, only modified portions are described.

Figure 12A:
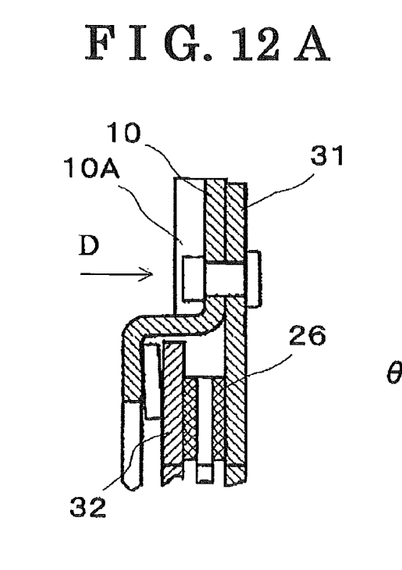
FIG. 12A is a radial sectional view schematically illustrating a main configuration of the torque fluctuation absorbing apparatus according to a fifth embodiment of the invention.
Figure 12B:
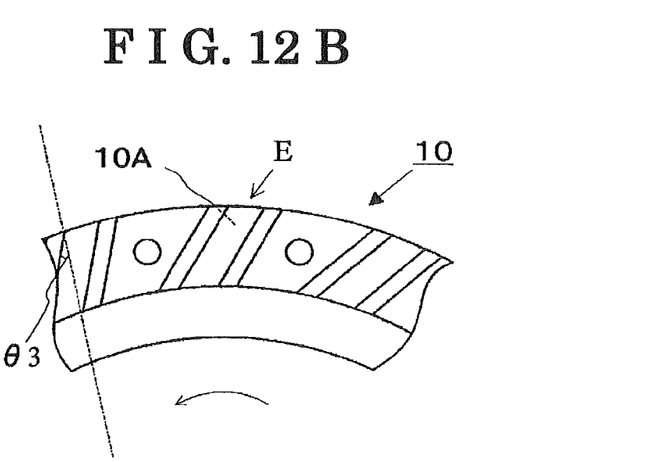
FIG. 12B is a plain view viewed from a direction of an arrow D.
Figure 12C:
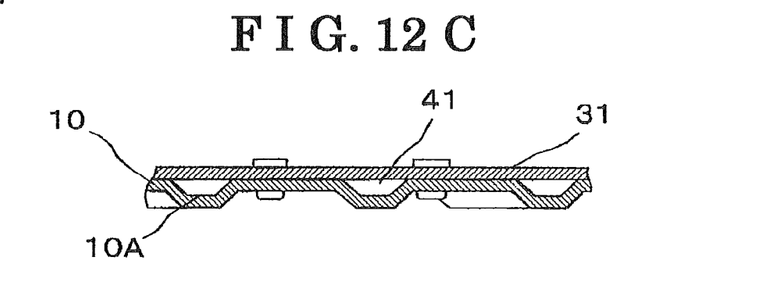
FIG. 12C is a side view viewed from a direction of an arrow E.

FIG. 12A is a radial sectional view schematically illustrating a configuration of the supporting member 10, and the first and second plates 31 and 32 of the torque fluctuation absorbing apparatus according to the fifth embodiment of the invention. FIG. 12B is a plain view viewed from a direction of an arrow D of FIG. 12A. FIG. 12C is a side view viewed from a direction of an arrow E of FIG. 12B.

Referring to FIG. 12, the supporting member 10 of the torque fluctuation absorbing apparatus according to the embodiment is formed with grooves 10A serving as discharge outlets 41 in the bonded surface with the first plate 31. The space defined around the outer circumference of the friction material 26 is in communication with the outer circumference of the torque fluctuation absorbing apparatus by the discharge outlets 41.

Plurality of the discharge outlets 41 are arranged in an identical direction (counterclockwise direction in FIG. 12) to a rotational direction of the flywheel 3. Each discharge outlet 41 is arranged being tilted at an angle ⊖3 in a radial direction.

According to the embodiment, in addition to the aforementioned effects of each embodiment, it is possible to discharge the causative substances of the corrosion and the oxidization, the abrasive powder and dust from the inside of the limiter mechanism by the rotations of the flywheel 3. Also, the discharge outlets 41 are arranged in the rotational direction of the flywheel 3 being tilted at the angle ⊖3, and thus the intrusion of the causative substances of the corrosion and the oxidization, the abrasion powder and dust can be prevented.

According to the aforementioned configurations, it is possible to restrain the occurrence of the corrosion on the sliding surfaces of the limit mechanism to operate the limit mechanism stably.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby

The invention claimed is:

1. A torque fluctuation absorbing apparatus provided between a driving source and a transmission and transmitting torque from the driving source to the transmission, the apparatus further absorbing fluctuations in the torque transmitted and limiting a maximum value of torque to be transmitted to the transmission, comprising:
   a flywheel connected with a driving shaft of the driving source;
   a supporting member unitarily rotating with the flywheel;
   a first plate having a sliding surface being corrosion resistant;
   a second plate having a sliding surface being corrosion resistant;
   a disc spring supported by the supporting member and biasing one of the first and second plates towards the other one thereof;
   a friction material sandwiched tightly between the sliding surface of the first plate and the sliding surface of the second plate; and
   a damper mechanism connected to the friction material and transmitting the torque transmitted from the driving source to an input shaft of the transmission,
   wherein one of the first and second plates is in contact with the friction material via a corrosion resistant member made of corrosion resistant material, the corrosion resistant member being an annular thin plate fixed to the one of the first and second plates, and
   wherein an engaging groove is provided on an outer circumference portion of the one of the first and second plates, one of the annular sliding surfaces being configured by engaging a pawl portion of the annular thin plate with the engaging groove.

2. A torque fluctuation absorbing apparatus according to claim 1, wherein the corrosion resistant member is made of stainless steel.

3. A torque fluctuation absorbing apparatus provided between a driving source and a transmission and transmitting torque from the driving source to the transmission, the apparatus further absorbing fluctuations in the torque transmitted and limiting a maximum value of torque to be transmitted to the transmission, comprising:
   a flywheel connected with a driving shaft of the driving source;
   a supporting member unitarily rotating with the flywheel;
   a first plate having a sliding surface being corrosion resistant;
   a second plate having a sliding surface being corrosion resistant;
   a disc spring supported by the supporting member and biasing one of the first and second plates towards the other one thereof;
   a friction material sandwiched tightly between the sliding surface of the first plate and the sliding surface of the second plate; and
   a damper mechanism connected to the friction material and transmitting the torque transmitted from the driving source to an input shaft of the transmission,
   wherein one of the first and second plates is in contact with the friction material via a corrosion resistant member made of corrosion resistant material, the corrosion resistant member being an annular thin plate fixed to the one of the first and second plates, and
   wherein an annular sliding surface component member, which is corrosion resistant, is fastened to the first plate by a rivet.

4. A torque fluctuation absorbing apparatus according to claim 3, wherein an axial length of the rivet is shorter than a total thickness of the first plate and the annular sliding surface component member.

5. A torque fluctuation absorbing apparatus according to claim 3, wherein the corrosion resistant member is made of stainless steel.

* * * * *